United States Patent Office 3,330,697
Patented July 11, 1967

3,330,697
METHOD OF PREPARING LEAD AND ALKALINE EARTH TITANATES AND NIOBATES AND COATING METHOD USING THE SAME TO FORM A CAPACITOR
Maggio P. Pechini, North Adams, Mass., assignor to Sprague Electric Company, North Adams, Mass., a corporation of Massachusetts
Filed Aug. 26, 1963, Ser. No. 304,434
7 Claims. (Cl. 117—215)

ABSTRACT OF THE DISCLOSURE

The method of preparing lead and the alkaline earth titanates and niobates, and any combinations and proportions thereof by way of resin intermediates. On ignition of the resin, the organic portion is removed, leaving the selected composition of mixed oxides chemically combined. The oxides are then sintered to a dense ceramic. By applying the resin film to an electrode substrate, followed by ignition, sintering and the application of a counterelectrode to the resulting ceramic, an electrical capacitor is formed.

---

The present invention relates to high purity dielectric materials and thin films of the same. More particularly, it relates to dielectric materials of precisely controlled constitution, to thin films of the same, and to capacitors utilizing the same.

The conventional method of preparing powder formulations used in the manufacture of ceramic dielectrics require the calcination of a mechanically-ground mixture of metal oxides and carbonates in definite proportions. The solid state reaction, a diffusion controlled process, requires intimacy of reacting species and a uniform distribution of each species to obtain a completely reacted and uniform product. The milling and grinding, normally employed to obtain a mixture in a fine state of subdivision, introduces contaminates from abrasive materials. These contaminates have a detrimental effect on the electrical properties and introduces a variance into each batch of powder prepared. The mechanically-ground mixture requires prolonged calcination at high temperatures. Such prolonged calcination promotes crystallite growth which is undesirable in the fabrication of dense fine-grained ceramics. To obtain optimum and reproducible electrical properties it is necessary to eliminate mechanical mixing and lower the calcination temperature.

It is extremely difficult to prepare dielectric films composed of two or more chemically combined oxides by conventional evaporation techniques. This requires the difficult art of controlling the rate of deposition of metal oxides from the vapor phase onto a substrate enclosed in an evacuated chamber. The high temperature and high vacuum required to vaporize the oxides cause variations in oxidation states and contamination from metal vapors. A process eliminating the cumbersome apparatus and tedious techniques is needed if mixed oxide dielectric films are to be produced economically.

It is an object of the present invention to overcome the foregoing and related problems.

A further object is to provide a process for forming high purity dielectrics.

Yet another object of the invention is to provide a method for precisely controlling the constitution of a high purity dielectric.

Still another object of the invention is to provide a method of forming a thin layer of high purity dielectric on a metallic substrate.

A still further object is a method of forming high purity piezoelectric compositions.

Figure 1:
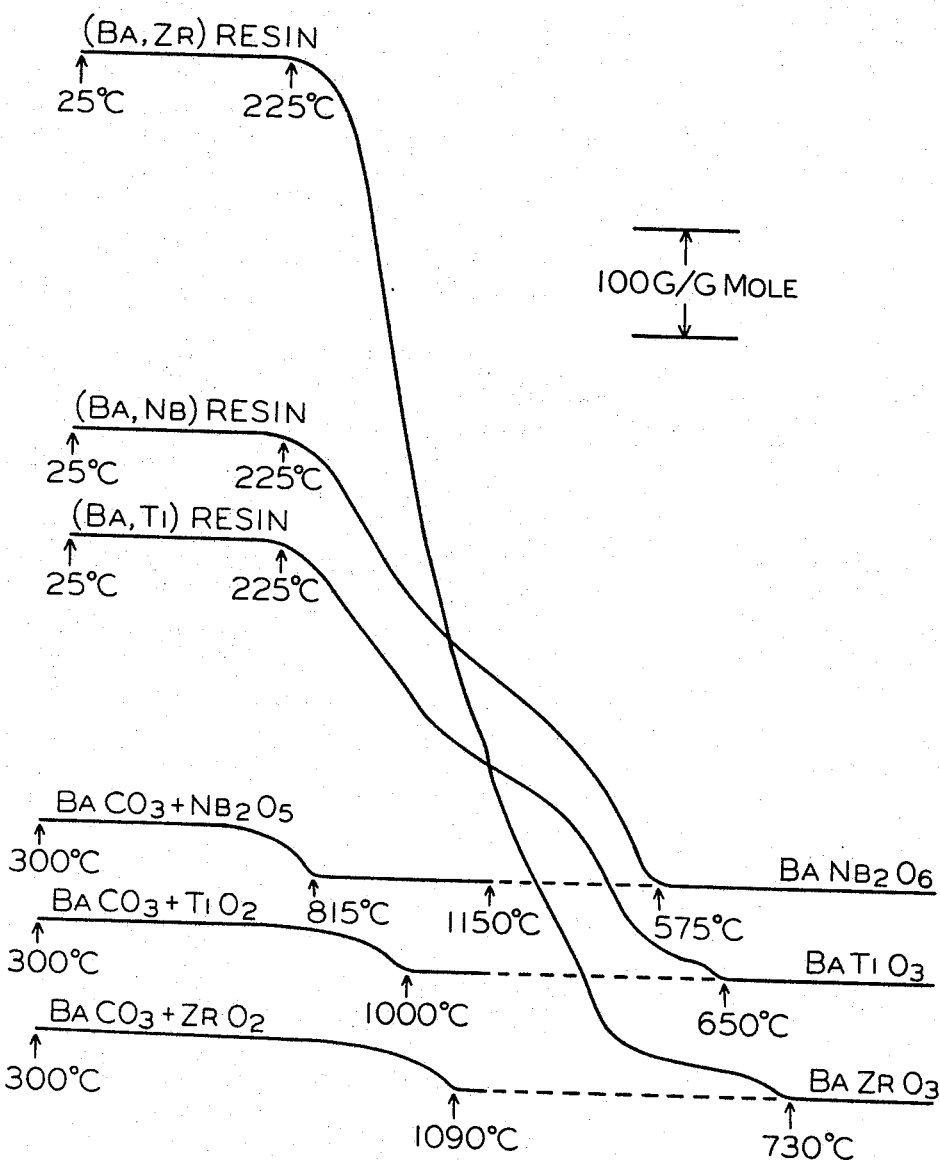
Figure 2:
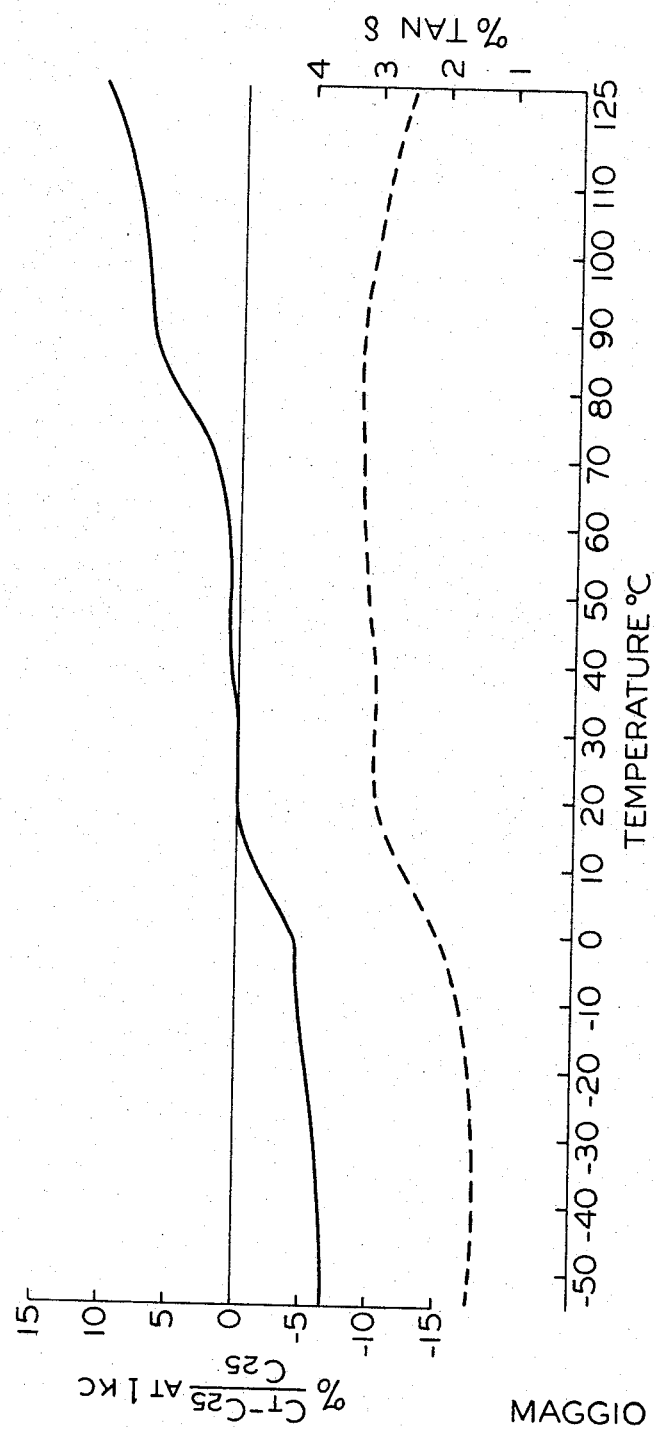

These and other objects and advantages will be apparent from the following description and accompanying drawing, in which:

FIGURE 1 shows a thermogram of several of the products resulting from the instant process; and FIGURE 2 shows the variation in capacitance and the dissipation factor of the unit of Example V.

Broadly, this invention is concerned with a method of preparing lead and alkaline earth titanates, zirconates and niobates, and any selected combinations and proportions thereof via resin intermediates. Ignition of the resin intermediates, at a relatively low temperature, removes the organic material and leaves the selected compositions of mixed oxides, chemically combined, pure, uniform, and in a finely divided state. The selected composition is then in a highly desirable state for sintering into a dense ceramic. Further the resin intermediate, being of a polymeric nature, can be deposited as a film on a conducting substrate. Subsequent ignition leaves a thin adherent coating of the selected composition. By application of a counterelectrode, large capacitance values per unit area can be obtained.

This invention utilizes the ability of certain alpha-hydroxycarboxylic acids, such as citric, lactic and glycolic acids to form polybasic acid chelates with titanium, zirconium and niobium. The chelates can undergo polyesterification when heated with a polyhydroxy alcohol.

The general procedure for preparing the resin intermediate involves dissolving one mole of at least one member of the group consisting of the hydrated oxide, alkoxide and alpha-hydroxycarboxylate of titanium, zirconium and niobium with from 2 to 8 moles of citric acid and an excess of a polyhydroxy alcohol which is liquid below about 100° C. until a clear solution is effected. Into this solution is dissolved from ½ to 1½ the stoichiometric equivalent of at least one basic metal compound from the group consisting of the oxide, hydroxide, carbonate and alkoxide of lead and the alkaline earth metals. On removal of the excess solvent by heating, no crystallization occurs, instead a transparent solid resin containing the metals in solid solution is formed. Calcination of the resin removes the organic constituents leaving the desired ceramic composition as the residue.

The acidic to basic metal oxide ratio in the resin intermediate is uniform throughout the solid phase and is identical to the ratio in the liquid phase. Thus by mixing solutions of known composition and concentration in appropriate volumes any selected combinations and ratios of metal oxide equivalents can be incorporated into the amorphous solid phase, i.e. the resin intermediate.

It should be made clear that this molecular-scale mixing is not achieved merely by mixing metal solutions in appropriate volumes. Most solutions containing two or more metals would on evaporation form a mixture of crystals of varying sizes and composition depending upon the ions present, solvent, rate of evaporation, etc. The solid intermediate resulting from the process of this invention contains the metal atoms bonded through oxygen to organic radicals comprising the cross-linked network, and thus interconnecting the reacting species, i.e. the acidic and basic metal oxides.

Compounds such as oxalates, tartrates, sulphates, etc., that form insoluble salts in the presence of alkaline earth cations are not used in this process. Compounds such as nitrates, chlorides, acetates, etc. which are soluble in the liquid phase but insoluble in the solid phase do not serve the objectives of this invention. For example, barium acetate is soluble in the titanium citrate-alcoholate solution, but on evaporation to remove excess solvent crystals of barium acetate form in the resinous mass. Ignition would produce essentially a mixture of barium carbonate and titanium dioxide, requiring mechanical grinding and higher temperatures to complete the conversion to barium titanate.

An important consequence of the molecular-scale mixing is a drastic reduction in calcination temperature. This is shown graphically in the accompanying drawing, FIGURE 1, which compares pyrolysis curves of the resin intermediates used to prepare barium niobate, titanate and zirconate with the conventional $BaCO_3$-metal oxide mixtures used to prepare the same compounds. The curves were prepared with a thermo-balance. This instrument automatically records the weight change of a sample being subjected to a linear temperature increase of 300° C. per hour.

The curves in FIGURE 1 show that the resin intermediate containing one mole of oxide equivalents begin to decompose at about 225° C., and at 575° C. one mole of $BaNb_2O_6$ is formed, at 650° C. one mole of $BaTiO_3$ and at 730° C. one mole of $BaZrO_3$. The barium carbonate-metal oxide mixture requires temperatures of 815° C., 1000° C. and 1090° C. to remove one mole of $CO_2$ per mole of $BaNb_2O_6$, $BaTiO_3$ and $BaZrO_3$. As is evident from the curves the decomposition of the barium titanium resin does not proceed through the formation of a $BaCO_3$-$TiO_2$ mixture as would be expected on the decomposition of a barium carboxylate-organotitanate mixture. The anomaly which appears at about 580° C. is due to the formation of a basic carbonate which decomposes to $BaTiO_3$ well below 1000° C. The pyrolysis curve of barium titanyl oxalate ($BaTiO(C_2O_4)_2 \cdot 4H_2O$, not shown) also shows the formation of a basic carbonate at about 580° C. which is decomposed to $BaTiO_3$ at 730° C.

EXAMPLE I

To prepare the titanium solutions used to prepare titanates or make $TiO_2$ additions, 400 grams of citric acid and 500 mls. of ethylene glycol are added to a fresh, well-washed precipitate of hydrated titanium oxide (orthotitanic acid) yielding approximately 64 grams of $TiO_2$. This is heated at about 110° C. and stirred until dissolution is effected. This solution is diluted to about 1000 ml. with water and filtered to remove any insolubles. A portion of the solution is assayed to determine the equivalent in $TiO_2$ in grams/ml. Alternatively, this solution can be prepared using tetra-isopropyl titanate which is a convenient source of soluble high purity titanium. To 500 mls. of ethylene glycol at room temperature is added slowly with stirring 250 mls. of the titanium ester. To this solution 400 grams of citric acid is added and this combination heated at about 110° C. with stirring to redissolve the hydrated titania which form on the addition of citric acid. The heating is continued until the odor of isopropyl alcohol is no longer detected. This solution is diluted to 1000 ml. with water, filtered and assayed. The approximate concentration is 0.064 gram of $TiO_2$ per ml. To prepare the barium titanium solution to prepare $BaTiO_3$ or $BaTiO_3$ admixtures, the stoichiometric barium equivalent is added to a measured volume of the above solution. To 100 ml. of the above solution yielding, say 6.400 grams of $TiO_2$, is added slowly 15.809 grams of $BaCO_3$. Heat is applied to hasten solution and expel $CO_2$. The solution is cooled to room temperature and the volume adjusted to 100 ml. with water. This solution will yield approximately 0.18 grams of $BaTiO_3$ per ml. The solution is assayed to determine the exact value. This can then be diluted to any convenient volume with water. To convert to $BaTiO_3$, the solution is heated in an open container to remove excess solvent until the solid resin intermediate is formed. The resin intermediate is calcined above 650° C. to form $BaTiO_3$. To prepare strontium, calcium, and magnesium titanium solutions the process is repeated using the appropriate carbonate in equivalent amounts. The resulting resin intermediate is calcined above 575° C., 560° C. and 540° C. to convert to $SrTiO_3$, $CaTiO_3$ and $MgTiO_3$ respectively. To prepare the lead titanium solution the equivalent amount of PbO is employed. Calcine the resin intermediate above 540° C. to obtain $PbTiO_2$.

EXAMPLE II

To prepare the zirconium solution, 165 grams of citric acid and 200 mls. of ethylene glycol are added to a fresh, well-washed precipitate of zirconium hydroxide yielding approximately 16 grams of $ZrO_2$. Heat while stirring at about 120° C. until dissolved; dilute to about 500 mls. with ethylene glycol, filter and assay. This solution yields approximately 0.03 gram of $ZrO_2$ per ml. The zirconium solution can also be prepared using zirconium lactate, which is a convenient source of soluble zirconium of high purity. To 90 grams of zirconium lactate is added 90 grams of citric acid and 200 ml. of glycol. This is heated at about 120° C. while stirring until dissolved, followed by dilution to 300 mls. with ethylene glycol, filtering and assaying. The concentration is about .05 gram of $ZrO_2$ per ml. All the solutions containing zirconium and niobium are diluted with ethylene glycol since water solutions are not stable on storage. The barium, strontium, calcium, magnesium and lead zirconium solutions are prepared as in Example I. In this case the metal oxide or hydroxide is preferred to the carbonate and ethylene glycol is the preferred solvent for volume adjustment. As in Example I, convert to the resin intermediate and calcine above 730° C. to obtain $BaZrO_3$, 520° C. to obtain $SrZrO_3$, 530° C. to obtain $CaZrO_3$ and above 510° C. to obtain $PbZrO_3$. The calcination of the magnesium zirconium resin intermediate above 530° C. appears to result in an intimate mixture of MgO and cubic $ZrO_2$.

EXAMPLE III

For the preparation of the niobium solution 20 grams of citric acid and 200 mls. of ethylene glycol were added to freshly precipitated, well-washed, hydrated niobium pentaoxide (columbic acid) yielding approximately 10 grams of $Nb_2O_5$. This was heated at about 120° C. while stirring until dissolved, then diluted to about 500 mls. with glycol, filtered and assayed. The solution yields approximately .02 gram of $Nb_2O_5$ per ml. The lead and alkaline earth metal niobium solutions are prepared as in Example I using the appropriate oxide or hydroxide in stoichiometric quantities and using ethylene glycol as the diluent. These are converted to the resin intermediates and calcined above 575° C. for $BaNb_2O_6$, above 560° C. for $SrNb_2O_6$, above 560° C. for $CaNb_2O_6$, above 590° C. for $MgNb_2O_6$, and above 560° C. for $PbNb_2O_6$.

The present invention includes in its scope the preparation of mixtures of at least two members of the group consisting of the titanates, zirconates and niobates of lead and the alkaline earth metals. This comprises (a) forming individual solutions of titanium, zirconium and niobium, in the form of a member of the group consisting of the hydrated oxide, alkoxide and alpha hydroxycarboxylate, with from 2–8 moles of citric acid dissolved in an excess of a polyhydroxy alcohol which is liquid below about 100° C.; (b) dissolving in a portion of each of said individual solutions from ½ to 1½ the stoichiometric equivalent of a basic metal compound from the group consisting of the oxide, hydroxide, carbonate and alkoxide of lead and the alkaline earth metals; (c) mixing at least two of the solutions of step (b); (d) evaporating the solvent to leave a resin intermediate and (e) calcining said resin to remove the organic portion thereof.

For certain special applications it is necessary to formulate various compositions which involve the use of three or more oxides. For example, the present process lends itself to the formulation of certain piezoelectric ceramic compositions such as, barium titanate-lead titanate; this composition modified with calcium titanate; barium titanate-calcium titanate; lead-titanate-zirconate; and this latter composition modified with zirconium and/or niobium.

EXAMPLE IV

An example of an isomorphously substituted composition used in piezoelectric devices is $Pb_{1-x}Sr_x(Zr_{1-y}Ti_y)O_3$, sometimes doped with $Nb_2O_5$. To prepare one gram mole simply combine the strontium and lead titanium solutions from Example I in exact volumes to yield $183.53x$ grams of $SrTiO_3$ and $303.11 (y-x)$ grams of $PbTiO_3$ with the lead zirconium solution of Example II in exact volume to yield $346.43 (1-y)$ grams of $PbZrO_3$. To dope with $Nb_2O_5$ add a volume of the niobium solution of Example III to yield the desired equivalents in $Nb_2O_5$. Heat the combined solutions in an open container to remove excess solvent and obtain a solid containing all the oxide equivalents in selected proportions, i.e. the resin intermediate. Calcine at 600° C. to burn off all organic material and chemically combine the oxides.

EXAMPLE V

*Capacitor formation*

Employing the procedure of Example I, a barium titanium solution containing the equivalent of about 0.04 gram of $BaTiO_3$/ml. is prepared. This solution is diluted with methanol 1:1 to yield about 0.02 gram of $BaTiO_3$/ml. To a clean flat surface of 3 mil thick aluminum foil is added 0.1 ml. of the solution. This will spread to cover an area of about 8 cm.² The coated aluminum is placed on a warm hot plate to drive off the volatile solvents. A transparent film will remain on the aluminum. The heat is increased stepwise, finally baking the coated foil at the maximum heat of the hot plate (i.e. about 400° C.) for about 2 hours. The coated foil is then transferred to a furnace at 610–630° C. for a period of about 30 minutes to convert the film to a layer of $BaTiO_3$ of about 0.3 to 0.5 micron thick. The coating and firing process is repeated to build-up a $BaTiO_3$ layer of approximately 1 micron in thickness. An air-dried silver counterelectrode of 0.3 cm.² was applied to the $BaTiO_3$. The capacitance of this unit is approximately 17,000 $\mu\mu f$. Three more units of the same size average 17,000 $\mu\mu f$.

Referring to FIGURE 2 it can be seen that the variation in capacitance of the unit of Example V at 1 kc. over the range of −55° C. to 120° C. is within ±10%. The dissipation factor at 1 kc. over the same range is shown to be relatively constant.

It is to be understood that in the preceding example methanol is but one of several volatile solvents that can be employed to permit the formation of extremely thin dielectric film. Also it is within the scope of the invention to use the undiluted solutions for certain dielectric film formations.

It is to be understood that any of the dielectrics disclosed herein can replace $BaTiO_3$ is the foregoing example. Likewise the counterelectrode is not limited to silver but may be any of the prior art electrodes, e.g. gold, the platinum metals, etc. The precise coating and firing procedure of Example V need not be adhered to. The firing may be accomplished in one step by gradually raising the temperature of the furnace. Before firing, the resin layer may be built-up to the desired thickness by successive applications of the methanol solution. Thereafter, the coated foil is fired. The electrode is not limited to either aluminum or a foil. It may be any electrode material capable of supporting the thin layer. For example, aluminum, silver, etc., wire may act as the inner electrode, upon which is applied the resin film.

As is evident from the foregoing, the invention is not to be limited to formation of the rather specific illustrative examples. Modifications and variations, as well as the substitution of equivalents may be made without departing from the spirit of the invention as defined in the appended claims.

What is claimed is:

1. The process of preparing a ceramic composition comprising dissolving at least one member of the group consisting of the hydrated oxide, alkoxide and alpha hydroxycarboxylate of titanium, niobium, and zirconium with citric acid in a polyhydroxy alcohol which is liquid below about 100° C., dissolving therein at least one basic metal compound from the group consisting of the oxide, hydroxide, carbonate and alkoxide of lead and the alkaline earth metals, and subjecting the composition to a temperature sufficiently high to remove the organic constituents thereof.

2. The process of preparing titanates, zirconates, niobates and mixtures thereof of lead and the alkaline earth metals, comprising (a) dissolving one mole of at least one member of the group consisting of the hydrated oxide, alkoxide and alpha hydroxycarboxylate of titanium, zirconium and niobium with 2–8 moles of citric acid in an excess of a polyhydroxy alcohol which is liquid below about 100° C., (b) dissolving therein from ½ to 1½ the stoichiometric equivalent of at least one basic metal compound from the group consisting of the oxide, hydroxide, carbonate and alkoxide of lead and the alkaline earth metals, (c) evaporating the excess alcohol to leave a resin intermediate, and (d) calcining said resin to remove the organic portion thereof.

3. The process of preparing barium titanate comprising heating up to about 110° C. one mole of a member of the group consisting of orthotitanic acid, titanium alkoxide and titanium alpha-hydroxycarboxylate with 2–8 moles of citric acid and an excess of ethylene glycol, dissolving therein the stoichiometric equivalent of a member of the group consisting of the oxide, hydroxide, carbonate and alkoxide of barium, evaporating the excess glycol to leave a resin intermediate and calcining said resin to yield barium titanate.

4. The process of preparing mixtures of at least two members of the group consisting of the titanates, zirconates and niobates of lead and the alkaline earth metals comprising: (a) forming individual solutions of titanium, zirconium and niobium, in the form of a member of the group consisting of the hydrated oxide, alkoxide and alpha hydroxycarboxylate, with from 2–8 moles of citric acid dissolved in an excess of a polyhydroxy alcohol which is liquid below about 100° C.; (b) dissolving in a portion of each of said individual solutions from ½ to 1½ the stoichiometric equivalent of a basic metal compound from the group consisting of the oxide, hydroxide, carbonate and alkoxide of lead and the alkaline earth metals; (c) mixing at least two of the solutions of step (b); (d) evaporating the excess alcohol to leave a resin intermediate and (e) calcining said resin to remove the organic portion thereof.

5. The method of forming a capacitor comprising applying to the surface of a metal electrode a resinous coating prepared by the process comprising dissolving at least one member of the group consisting of the hydrated oxide, alkoxide, and alpha-hydroxycarboxylate of titanium, niobium and zirconium with citric acid in an excess of a polyhydroxy alcohol which is a liquid below 100° C.; dissolving therein at least one basic metal compound from the group consisting of the oxide, hydroxide, carbonate and alkoxide of lead and the alkaline earth metals; evaporating the excess alcohol from the coated metal electrode; calcining the coated electrode to yield a dielectric layer thereon and applying thereto a counterelectrode.

6. The method of forming a film capacitor comprising applying to the surface of a metal electrode a resinous coating prepared by the process comprising:

(a) dissolving one mole of at least one member of the group consisting of the hydrated oxide, alkoxide, and alpha-hydroxycarboxylate of titanium, zirconium and niobium, with 2–8 moles of citric acid in an excess of a polyhydroxy alcohol which is liquid below 100° C.;

(b) dissolving therein from ½ to 1½ the stoichiometric equivalent of at least one basic metal compound from the group consisting of the oxide, hydroxide, carbonate and alkoxide of lead and the alkaline earth metals;

(c) diluting this solution with a volatile solvent; evaporating the volatiles from the coated electrode to leave a resinous film thereon, calcining the coated electrode to yield a dielectric layer thereon; and applying to said dielectric a counterelectrode.

7. The method of forming a barium titanate film capacitor comprising preparing a resin intermediate solution by the steps of:
 (a) dissolving one mole of at least one member of the group consisting of the hydrated oxide, alkoxide, and alpha-hydroxycarboxylate of titanium, zirconium and niobium with 2–8 moles of citric acid in excess of a polyhydroxy alcohol which is liquid below about 100° C.,
 (b) dissolving therein from ½ to 1½ the stoichiometric equivalent of at least one metal compound from the group consisting of the oxide, hydroxide, carbonate and alkoxide of lead and the alkaline earth metals;
 (c) diluting this solution with methanol in a ratio of about 1:1 by volume,
 (d) applying the dilute solution to one surface of aluminum foil,
 (e) evaporating therefrom the volatile solvents to leave a resinous film on said foil,
 (f) calcining the film to yield a continuous, flexible, barium titanate layer; and
 (g) applying a counterelectrode to said barium titanate.

References Cited
UNITED STATES PATENTS

| | | | |
|---|---|---|---|
| 2,989,481 | 6/1961 | Miller | 252—62.9 |
| 3,002,861 | 10/1961 | Suchoff | 117—221 |
| 3,066,048 | 11/1962 | Mitchell | 117—221 |

ALFRED L. LEAVITT, *Primary Examiner.*

WILLIAM L. JARVIS, *Assistant Examiner.*

UNITED STATES PATENT OFFICE
CERTIFICATE OF CORRECTION

Patent No. 3,330,697                                  July 11, 1967

Maggio P. Pechini

It is hereby certified that error appears in the above numbered patent requiring correction and that the said Letters Patent should read as corrected below.

Column 7, line 12, after "in" insert -- an --.

Signed and sealed this 20th day of August 1968.

(SEAL)
Attest:

Edward M. Fletcher, Jr.                              EDWARD J. BRENNER
Attesting Officer                                        Commissioner of Patents